United States Patent
Mitchell et al.

(10) Patent No.: US 6,961,473 B1
(45) Date of Patent: Nov. 1, 2005

(54) FASTER TRANSFORMS USING EARLY ABORTS AND PRECISION REFINEMENTS

(75) Inventors: Joan LaVerne Mitchell, Longmont, CO (US); Jennifer Quinn Trelewicz, Superior, CO (US); Michael Thomas Brady, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 09/694,455

(22) Filed: Oct. 23, 2000

(51) Int. Cl.$^7$ .............................................. G06K 9/36
(52) U.S. Cl. ...................................... 382/240; 382/252
(58) Field of Search . 382/232–253; 375/240.18–240.2

(56) References Cited

U.S. PATENT DOCUMENTS

| | | |
|---|---|---|
| 4,837,724 A | 6/1989 | Borgers et al. |
| 4,860,097 A | 8/1989 | Hartnack et al. |
| 5,301,242 A | 4/1994 | Gonzales et al. |
| 5,379,122 A | 1/1995 | Eschbach |
| 5,412,741 A * | 5/1995 | Shapiro ...................... 382/232 |
| 5,528,533 A | 6/1996 | Kitaura et al. |
| 5,533,052 A | 7/1996 | Bhaskar |
| 5,539,836 A | 7/1996 | Babkin |
| 5,629,778 A * | 5/1997 | Reuman ...................... 382/252 |
| 5,642,438 A | 6/1997 | Babkin |
| 5,649,077 A | 7/1997 | On et al. |
| H1684 H | 10/1997 | de Queiroz et al. |
| 5,701,263 A | 12/1997 | Pineda |
| 5,781,239 A | 7/1998 | Mattela et al. |
| 5,787,204 A * | 7/1998 | Fukuda ....................... 382/250 |
| 5,790,775 A | 8/1998 | Marks et al. |
| 5,805,482 A | 9/1998 | Phillips |
| 5,822,003 A | 10/1998 | Girod et al. |
| 5,822,484 A | 10/1998 | Arroyo |
| 5,854,757 A | 12/1998 | Dierke |
| 5,867,601 A | 2/1999 | Phillips |
| 6,002,809 A | 12/1999 | Feig et al. |
| 6,009,207 A | 12/1999 | Chen |
| 6,044,176 A | 3/2000 | Kim et al. |
| 6,067,384 A | 5/2000 | Manickam et al. |
| 6,073,218 A | 6/2000 | DeKoning et al. |
| 6,092,920 A | 7/2000 | Sakamoto |
| 6,097,846 A | 8/2000 | Abe |
| 6,112,219 A | 8/2000 | Girod et al. |
| 6,115,772 A | 9/2000 | Crater |
| 6,359,928 B1 * | 3/2002 | Wang et al. ............ 375/240.05 |

FOREIGN PATENT DOCUMENTS

JP        11-215499        8/1999

OTHER PUBLICATIONS

Mensa-Ababio, "Improced transform coding" Proc. ICASSP-1989 vol. 3, pp. 1827-1830, May 1989.*

Mukherjee et al. "Vector set partitioning with classified successive refinment VQ for embedded wavelet image coding" Proc. IEEE ISCAS 1998, vol. 4, pp. 25-28, 6/1998.*

* cited by examiner

*Primary Examiner*—Jingge Wu
(74) *Attorney, Agent, or Firm*—Chambliss, Bahner & Stophel, P.C.; David W. Lynch

(57) ABSTRACT

Fast transforms that use early aborts and precision refinements are disclosed. When to perform a corrective action is detected based upon testing the incremental calculations of transform coefficients. Corrective action is then performed. The corrective action includes refining the incremental calculations to obtain additional precision and/or aborting the incremental calculations when the resulting numbers are sufficient.

17 Claims, 11 Drawing Sheets

FASTER TRANSFORMS USING EARLY ABORTS AND PRECISION REFINEMENTS

CROSS-REFERENCE TO RELATED APPLICATION

This application is related to the following co-pending and commonly-assigned patent applications, which are hereby incorporated herein by reference in their respective entirety:

"FASTER DISCRETE COSINE TRANSFORMS USING SCALED TERMS" to Brady et al., Ser. No. 09/694,452.

"FASTER TRANSFORMS USING SCALED TERMS" to Trelewicz et al., Ser. No. 09/694,448.

BACKGROUND OF THE INVENTION

1. Field of the Invention

This invention relates in general to data processing, and more particularly to faster transforms that use early aborts and precision refinements.

2. Description of Related Art

Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real-time and/or fast execution where compression may or may not be used.

Data compression is desirable in many data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in memory. Here the amount of media space on which the image data is stored can be substantially reduced with compression. Generally speaking, scanned images, i.e., electronic representations of hard copy documents, are often large, and thus make desirable candidates for compression.

In data processing, data is typically represented as a sampled discrete function. The discrete representation is either made deterministically or statistically. In a deterministic representation, the point properties of the data are considered, whereas, in a statistical representation, the average properties of the data are specified. In particular examples referred to herein, the terms images and image processing will be used. However, those skilled in the art will recognize that the present invention is not meant to be limited to processing images but is applicable to processing different data, such as audio data, scientific data, image data, etc.

In a digital image processing system, digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

Signal and image processing frequently require converting the input data into transform coefficients for the purposes of analysis. Often only a quantized version of the coefficients is needed (e.g. JPEG/MPEG data compression or audio/voice compression). Many such applications need to be done fast in real time such as the generation of JPEG data for high speed printers.

Pressure is on the data signal processing industry to find the fastest method by which to most effectively and quickly perform the digital signal processing. As in the field of compression generally, research is highly active and competitive in the field of fast transform implementation. Researchers have made a wide variety of attempts to exploit the strengths of the hardware intended to implement the transforms by exploiting properties found in the transform and inverse transform.

One such technique is the ISO 10918-1 JPEG International Standard/ITU-T Recommendation T.81. The draft JPEG standard is reproduced in Pennebaker and Mitchell, JPEG: Still Image Data Compression Standard, New York, Van Nostrand Reinhold, 1993, incorporated herein by reference. One compression method defined in the JPEG standard, as well as other emerging compression standards, is discrete cosine transform (DCT) coding. Images compressed using DCT coding are decompressed using an inverse transform known as the inverse DCT (IDCT). An excellent general reference on DCTs is Rao and Yip, Discrete Cosine Transform, New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and ITU-T Recommendation H.261. Both of these standards rely in part on DCT coding and IDCT decoding.

However, research generally focuses on specific techniques, such as the above-mentioned techniques that used DCT coding to provide the desired degree of compression. Nevertheless, other transforms may be used to provide certain advantages under certain circumstances. For example, in the DCT compression coding method discussed above, an input image is divided into many uniform blocks and the two-dimensional cosine transform function is applied to each block to transform the data samples into a set of transform coefficients to remove the spatial redundancy. However, even though a high compression rate may be attained, a blocking effect, which may be subtle or obvious, is generated. Further, vector quantization methods that may be utilized by the compression system are advantageous due to their contribution to the high compression rate. On the other hand, a sub-band method may reduce the blocking effect which occurs during high rates of data compression. The wavelet transform (WT) or Sub-Band Coding (SBC) methods encode signals based on, for example, time and frequency components. As such, these transform methods can be useful for analyzing non-stationary signals and have the advantage that they may be designed to take into account the characteristics of the human visual system (HVS) for image analysis.

Scaled terms may be used to replace multiplicative constants like cosine terms in a Discrete Cosine Transform (DCT) with a minimum number of additions/subtractions. However, the scaled terms merely approximate the constants in the transform equations. Thus, some error is accepted to keep the precision confined to a fixed number of bits or to minimize the number of operations. If the resulting numbers are further from a decision boundary (e.g., a threshold value or a quantization boundary) than the maximum possible error, the result will not be affected by the approximations. However, the resulting numbers may be determined, during the incremental calculations, to require additional precision. Yet, the original input values are no longer available in the registers, and refetching the original input values from memory can impose cycles associated with cache misses and memory latency. The brute-force option is to perform an inverse transform (e.g., an IDCT) on the values, and then re-run the forward transform (e.g., FDCT, sometimes denoted just DCT) with higher precision. The disadvantage of the brute force approach is that operations are wasted.

It can be seen then that there is a need to provide faster transforms that use early aborts and precision refinements to save processing cycles thereby providing faster transform calculations and decreased execution times.

SUMMARY OF THE INVENTION

To overcome the limitations in the prior art described above, and to overcome other limitations that will become apparent upon reading and understanding the present specification, the present invention discloses faster transforms that use early aborts and precision refinements.

The present invention solves the above-described problems by detecting when to perform a corrective action based upon testing the incremental calculations of transform constants and performing the corrective action: refining the incremental calculations to obtain additional precision and/or aborting the incremental calculations when the resulting number is going to be too small. Those skilled in the art will recognize that throughout this specification, the term "matrix" is used in both its traditional mathematical sense and also to cover all hardware and software systems which when analyzed could be equivalently represented as a mathematical matrix.

A method in accordance with the principles of the present invention includes testing at least one number resulting from an incremental calculation of transform coefficients during a transform, determining whether to perform a corrective action based upon the testing and performing the corrective action when a corrective action is determined to be needed.

Other embodiments of a method in accordance with the principles of the invention may include alternative or optional additional aspects. One such aspect of the present invention is that the determining comprises detecting whether the incremental calculation of the transform coefficients will result in transform coefficients with unacceptable precision and the performing corrective action comprises refining the at least one number.

Another aspect of the present invention is that the transform comprises a transform matrix and wherein the refining comprises applying a refinement matrix for increasing precision of the incremental calculation of the transform constants.

Another aspect of the present invention is that the refinement matrix comprises $I+_dD_{m+1}\ D_m^{-1}$.

Another aspect of the present invention is that the method further includes generating at least one refinement matrix based on approximately calculated transform constants.

Another aspect of the present invention is that the generating at least one refinement matrix is performed offline or at initialization.

Another aspect of the present invention is that the generating the refinement matrix comprises recognizing that an approximate transform is invertible, generating the refinement matrix given by $I+_dD_{m+1}\ D_m^{-1}$, and structuring the transform for efficient computation.

Another aspect of the present invention is that the generating the refinement matrix includes recognizing that recovery of the nth column of a transform matrix for generating the transform is impossible, calculating a pseudo inverse for a portion of the transform matrix and generating an approximation for the refinement matrix using the pseudo inverse for the transform matrix.

Another aspect of the present invention is that the approximation of the refinement matrix comprises $I+_dD_{1d}\ D_0$.

Another aspect of the present invention is that the determining further comprises determining whether an error resulting from terminating the incremental calculation is acceptable and the performing corrective action comprises aborting the incremental calculation of a transform coefficient.

Another aspect of the present invention is that the incremental calculation is terminated when a determination is made that the incremental calculation will result in a number that is projected to be within a predetermined range.

Another aspect of the present invention is that the number that is projected to be within a predetermined range comprises a transform coefficient that does satisfy a precision requirement.

Another aspect of the present invention is that the incremental calculation is terminated when a refinement to the transform coefficient is determined not to change the result.

Another aspect of the present invention is that a refinement to the transform coefficient is determined not to change the result when, after checking the relative magnitudes of the results of the incremental calculations, an intermediate calculation of at least one transform coefficient is small compared to the intermediate calculation of another transform coefficient.

Another aspect of the present invention is that a refinement to the transform coefficient is determined not to change the result when, after checking the magnitude of the results of at least one incremental calculation, at least one intermediate calculation of the transform coefficient is less than a predetermined threshold.

Another aspect of the present invention is that the determining further comprises determining that a transform coefficient is going to be within a predetermined range of zero and the performing corrective action comprises aborting the incremental calculation of the transform coefficient.

In another embodiment of the present invention, a data compression system is provided. The data compression system includes a transformer for applying a linear analysis transform to decorrelate data into transform coefficients using transform equations, the transformer reducing errors of the transform by testing at least one number resulting from an incremental calculation of transform coefficients during a transform, determining whether to perform a corrective action based upon the testing and performing the corrective action when a corrective action is determined to be needed.

In another embodiment of the present invention, a printer is provided. The printer includes memory for storing image data, a processor for processing the image data to provide a print stream output and a printhead driving circuit for controlling a printhead to generate a printout of the image data, wherein the processor reduces errors of the transform by testing at least one number resulting from an incremental calculation of transform coefficients during a transform, determining whether to perform a corrective action based upon the testing and performing the corrective action when a corrective action is determined to be needed.

In another embodiment of the present invention, an article of manufacture is provided. The article of manufacture includes a program storage medium readable by a computer, the medium tangibly embodying one or more programs of instructions executable by the computer to perform a method for reducing errors during data processing, the method including testing at least one number resulting from an incremental calculation of transform coefficients during a transform, determining whether to perform a corrective action based upon the testing and performing the corrective action when a corrective action is determined to be needed.

In another embodiment of the present invention, a data analysis system is provided. The data analysis system includes transform equations formed by testing at least one number resulting from an incremental calculation of transform coefficients during a transform, determining whether to perform a corrective action based upon the testing and performing the corrective action when a corrective action is determined to be needed and a transformer for applying the transform equations to perform a linear transform to decorrelate data into transform coefficients.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides faster transforms that use early aborts and precision refinements. Faster transforms are obtained by detecting when to perform a corrective action based upon testing the incremental calculations of transform coefficients and performing the corrective action: refining the incremental calculations to obtain additional precision and/or aborting the incremental calculations when at least one resulting number is going to be too small.

Figure 1:
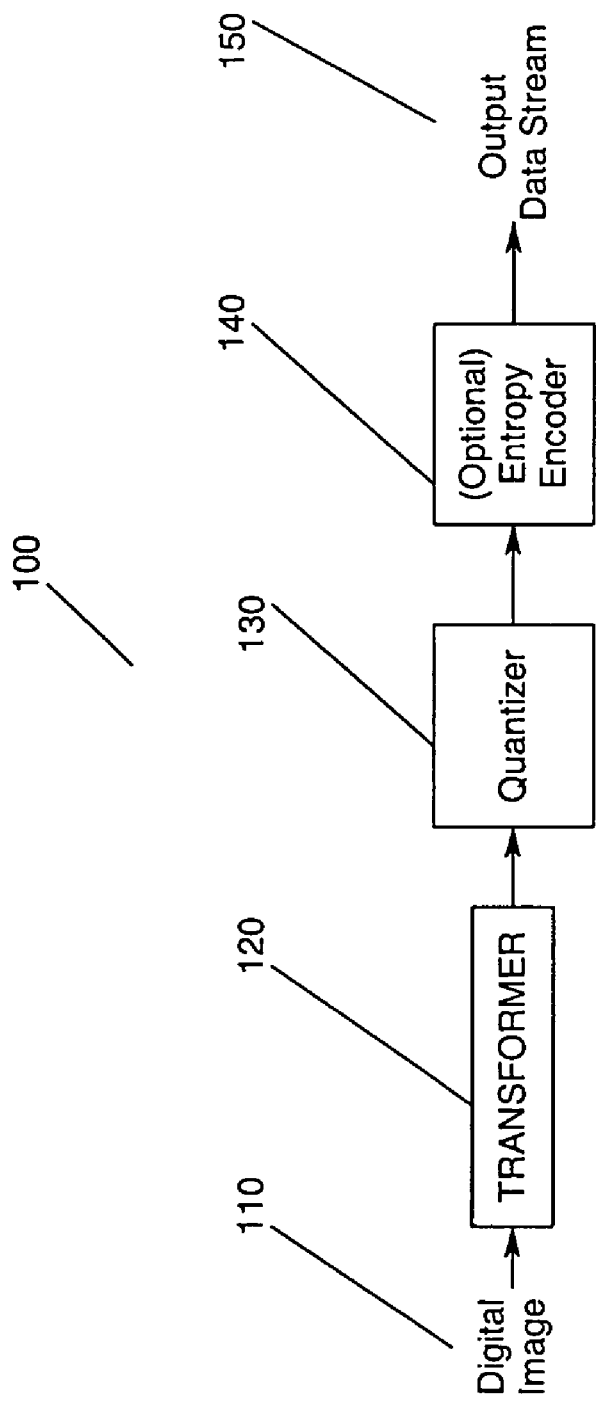
FIG. 1 illustrates a typical image compression system.

FIG. 1 illustrates a typical image compression system 100. The data compression system may include three closely connected components namely (a) Transformer 120, (b) Quantizer 130, and (c) Optional Entropy Encoder 140. Output data stream 150 is compressed by applying a linear transform to decorrelate the image data 110, quantizing the resulting transform coefficients, and, if desired, entropy coding the quantized values. A variety of linear transforms have been developed which include Discrete Fourier Transform (DFT), Discrete Cosine Transform (DCT), Discrete Wavelet Transform (DWT) and many more, each with its own advantages and disadvantages.

The quantizer 130 simply reduces the number of bits needed to store the transformed coefficients by reducing the precision of those values. Since this is a many-to-one mapping, it is a lossy process and is the significant source of compression in such an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

The optional entropy encoder 140 further compresses the quantized values losslessly to give better overall compression. It may use a model to accurately determine the probabilities for each quantized value and produces an appropriate code based on these probabilities so that the resultant output data stream 150 will be smaller than the input stream. The most commonly used entropy encoders are the Huffman encoder and the arithmetic encoder, although for applications requiring fast execution, simple run-length encoding (RLE) has proven very effective.

The term image transforms usually refers to a class of unitary matrices used for representing images. This means that images can be converted to an alternate representation using these matrices. These transforms form the basis of transform coding. Transform coding is a process in which the coefficients from a transform are coded for transmission.

The signal F(x) is a function mapping each integer from 0 . . . n−1 into a complex number. An example is given by a line of a sampled or pixelated image, where the samples or pixels are equally spaced. An "orthogonal basis" for a collection of such F(x) is a set $\{b_y(x)\}_{y=0}^{n-1}$ of functions, where $$\sum_{x=0}^{n-1} b_y(x) b_z(x) = 0$$

for $y \neq z$. A "transform" of $F(x)$, denoted $\hat{F}(y)$, is given by $$\hat{F}(y) = \sum_{x=0}^{n-1} F(x) b_y(x).$$

Transforms of this type are used in many signal and image processing applications to extract information from the original signal F One example of a transform is the discrete Fourier transform (DFT), where $b_y(x) = \exp(2\pi i x y/n)$. A related example is the discrete cosine transform (DCT), where $b_y(x) = \cos(2\pi x y/n)$ Another example is the wavelet transform, where $b_y(x)$ is a particular scaled and offset version of the mother wavelet function. (See, Ingrid Daubechies, *Ten Lectures on Wavelets*, Society for Industrial & Applied Mathematics, (May 1992)).

The theoretical basis for the independent scaling operations will now be demonstrated by showing the mathematical basis for being able to perform the scales without destroying the structure of the transform. Define a transform $$\hat{F}(y) = \sum_{x=0}^{n-1} F(x) b_y(x).$$

Consider those cases (described below) when the $b_y(x)$ are such that this transform can be split into two or more disjoint sums, regardless of the structure of $F(x)$. (The term "disjoint", when used herein in reference to the sets of equations, means that there are no transform coefficients in common between equations in the two disjoint sets of equations.) For example, if $b_{2y}(x)$ have even symmetry, and $b_{2y+1}(x)$ have odd symmetry, it is known from mathematics that any $F(x)$ can be written uniquely as $F(x) = F_e(x) + F_o(x)$, where $F_e(x)$ is even (symmetric about zero) and $F_o(x)$ is odd (anti-symmetric about zero), and that $$\sum_x F_e(x) b_{2y-1}(x) = \sum_x F_o(x) b_{2y}(x) = 0.$$

This enables the transform to be written equivalently as:

$$\hat{F}(y) = \sum_{y=0}^{\lfloor (n-1)/2 \rfloor} F_e(x) b_{2y}(x) + \sum_{y=1}^{\lfloor n/2 \rfloor} F_o(x) b_{2y-1}(x)$$

Figure 2:
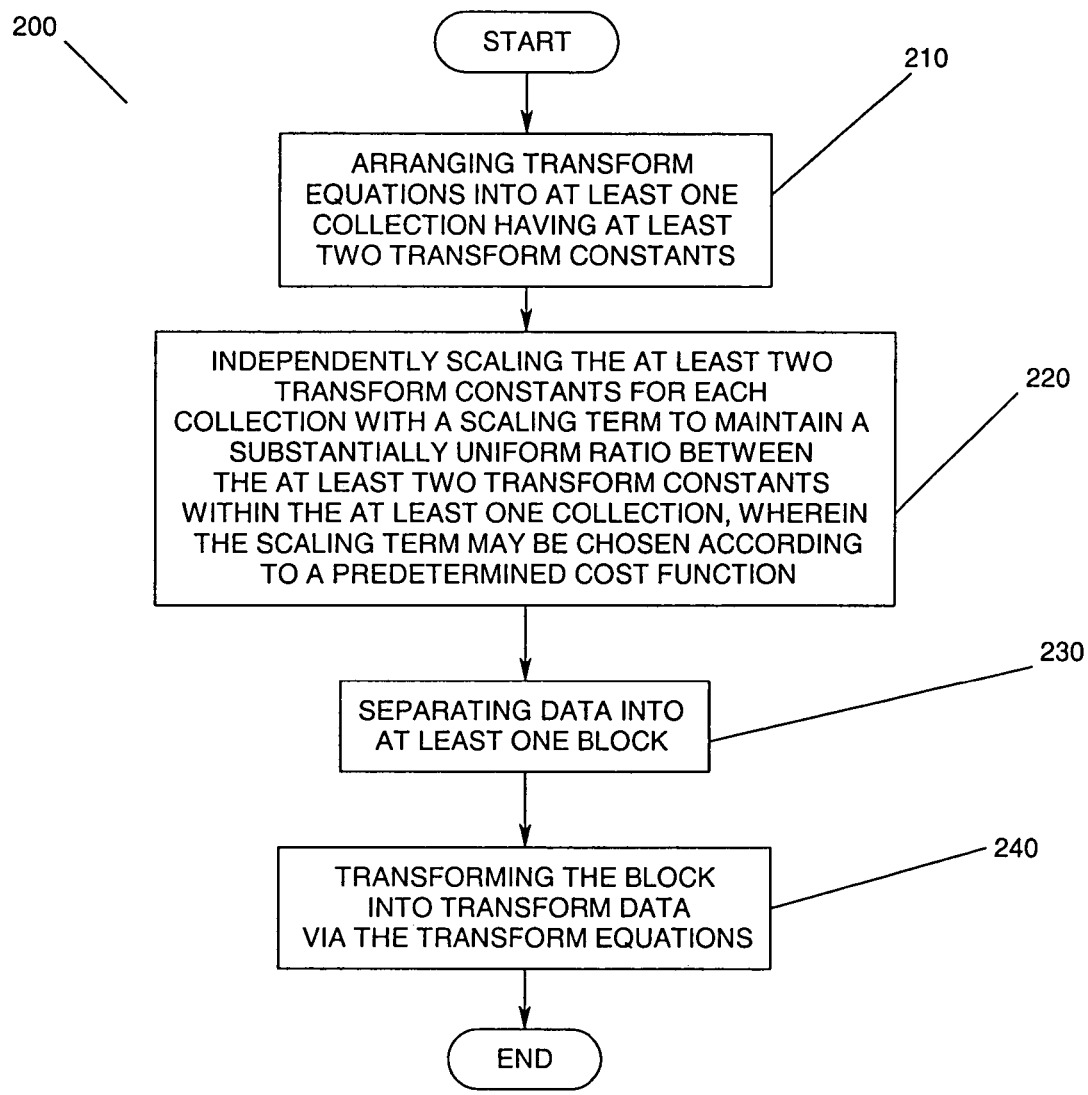
FIG. 2 illustrates a flow chart of a method for providing faster transforms using scaled terms.

FIG. 2 illustrates a flow chart 200 of a method for providing faster transforms using scaled terms. In FIG. 2, transform equations are split into at least one sub-transform having at least two transform constants 210. The term "sub-transforms", as used herein, references the collection of equations used to generate a subset of the transformed terms, where the subset may contain all of the transformed terms, or fewer that the total number of transformed terms. Next, the transform constants for each collection are scaled independently of the other collections with a scaling term to maintain a substantially uniform ratio between the transform constants within the collection, wherein the scaling term may be chosen according to a predetermined cost function 220. The result is the transform equations for transforming the block. Then, data is separated into at least one block 230. The block is then transformed into transformed data using the transform equations 240. Referring to the quantizer 130 of FIG. 1, the transformed data may then be quantized by incorporating the scaling into the quantization. Choosing the scaled term for the constants requires the use of a cost function that represents the needs of the target system.

Scaled terms may be used to replace multiplicative constants like cosine terms in a Discrete Cosine Transform (DCT) with a minimum number of additions/subtractions. For a 1-D DCT, an 8×1 input vector F may be multiplied by an 8×8 transform matrix D: $\hat{F} = DF$. In the case of the 2-D DCT, the input vector F is replaced with an 8×8 matrix F, and the DCT is performed as DFD', where D' is the transpose of D. Put $$D = \sum_{k=0}^{n} {}_d D_k,$$

where ${}_d D_k$, the "detail disform", is the kth refinement to an approximation to D. Put $$D_m = \sum_{k=0}^{m} {}_d D_k$$

and $\hat{F}_m = D_m F$; i.e., the mth approximation to $\hat{F}$. Those skilled in the art will recognize that the 8×8 matrix of input samples and corresponding 8×8 transform matrix could be replaced with N1×N2 matrix of input samples using $N_1 \times N_1$ transform on the left and $N_2 \times N_2$ transform on the right.

However, because the scaled terms merely approximate the constants in the transform equations, some error is accepted to keep the precision confined to a fixed number of bits or to minimize the number of operations. If the resulting numbers are further from a decision boundary (e.g., a threshold value or a quantization boundary) than the maximum possible error, the result will not affected by the approximations. Nevertheless, faster transforms may then be obtained by refining the incremental calculations to obtain additional precision if the resulting numbers are determined during the incremental calculations to require additional precision.

Figure 3:
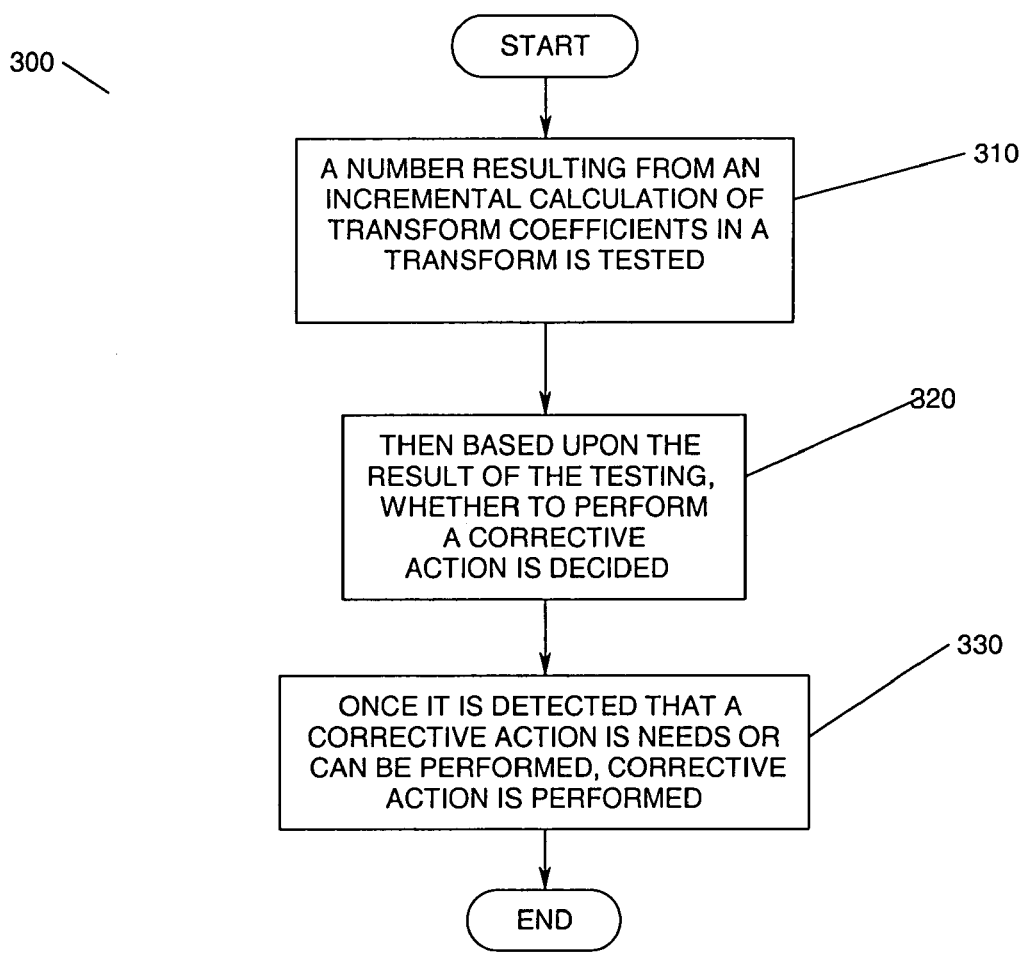
FIG. 3 illustrates a flow chart for providing faster transforms using corrective action to provide faster transform calculations and decreased execution times.

FIG. 3 illustrates a flow chart 300 for providing faster transforms using corrective action to provide faster transform calculations and decreased execution times. At least one number resulting from an incremental calculation using transform constants in a transform is tested 310. Then, based upon the testing, when to perform a corrective action is determined 320. Once it is determined that a corrective action is to be performed, the corrective action is performed 330.

A first example of refinement occurs when each ${}_d D_k$ adds an at least one additional bit of precision to the transform performed by D. A second example occurs when at least one element of the transform vector, $\hat{F}$, is assumed to be very small, so that an entire row of $_dD_k$ may be approximated as zero, enabling us to skip the calculation of that at least one element of F.

In the first example, it is often the case that all of the $D_k$ axe invertible; i.e., a matrix $D_k^{-1}$ exists such that $D_k D_k^{-1} = D_k^{-1} D_k = I$, the identity matrix, which has ones on the upper left to lower right diagonal, and zeros elsewhere. In this case, it may be noted that $$\hat{F}_{m+1} = D_{m+1} D_m^{-1} \hat{F}_m = (I + _d D_{m+1} D_m^{-1}) \hat{F}_m$$

(where I is the identity matrix); i.e., the additional step of precision is provided by performing one more step of transform to the transformed coefficients. Using this additional step transform to add the precision is the first embodiment of refinement provided by this invention, since it saves performing both IDCT and subsequent DCT: the matrix for $(I + _d D_{m+1} D_m^{-1})$ can be calculated ahead of time as a matrix $R_{m+1}$, so that $\hat{F}_{m+1} = R_{m+1} \hat{F}_m$, a single-step transform on $F_m$.

The second example of refinement requires a different approach. Consider a specific example, where the 2-D transform has already been performed with high precision in the first dimension, FD', $_dD_0$ has its 8th row zero, and $_dD_1 = D - _dD_0$. Then $_dD_0$ is not invertible; i.e., there is no way to recover the original 8 columns of FD' from $_dD_0$FD' (this follows from the fact that finding FD' from $_dD_0$FD' may be viewed as 7 equations in 8 unknowns). However, if an assumption is made for one of the 8 columns of FD', then the other 7 columns can be estimated from $_dD_0$FD', contingent on the assumption for the 8th column. A reasonable assumption is that the 8th column contains small elements that may be approximated as zero, since the higher-numbered transformed values tend to be less significant in real images than the lower-numbered transformed values. Then $_dD_0$ may be treated as an 8×7 matrix (ignoring the zero row), the pseudo-inverse, $_d\tilde{D}_o$, (as is well-known in the literature) is found by $$_d\tilde{D}_o = (_dD_{0d}D_0)^{-1} _dD'_0,$$

with an 8th row of zeros inserted for the assumed 8th coefficients. This gives an 8×8 approximation for $_dD_0^{-1}$, so that we can approximate $$\hat{F}_1 = (I + _dD_{1d}\tilde{D}_0)\hat{F}_0$$

This approximate refinement is the second embodiment of the refinement invention, which saves the cycles of the IDCT followed by the DCT, as in the first example.

The abort procedure is used to determine when a calculation can be terminated before its completion to save cycles, when the result of the calculation is projected to be too small, so that it wilt be quantized to zero. One example of the application of the abort procedure appears in example 2 above, where at least one low-magnitude transform coefficient is not calculated, being essentially equivalent to setting the corresponding row or rows of the transform matrix to zero. Another example is stopping a calculation with limited precision, when additional transform precision is projected to provide negligible additional information in the transformed values; e.g., when the result of the calculation is projected to be small. An alternative method involves testing the magnitude of the sums and/or differences of some of the inputs to the transform. For example, for the FDCT, the following equation calculates the second transform coefficient:

$$2S(2) = C_2 d_{0734} + C_6 d_{1625}$$

where $d_{0734} = s_{07} - s_{34}$ and $d_{1625} = s_{16} - s_{25}$, notation from Pennebaker and Mitchell's JPEG text. The magnitudes of these values can be tested for impact on subsequent processing of the transform coefficients. In this example, if S(2) is less than the magnitude of Q/2 (where Q is a quantization value for S(2)), then S(2) will be quantized to zero. This translates to a test of whether $d_{0734}$ is less than $Q/(2C_2)$ in magnitude and $d_{1625}$ is less than $Q/(2C_6)$ in magnitude. If this test is met, then the calculation for S(2) can be aborted, and S(2) set to its quantized value of zero. This method of testing sums and/or differences of the input values can be extended to all of the equations for the FDCT.

It is not obvious how to turn a comparison such as $-\hat{T} < \hat{F} < \hat{T}$ (a term-by-term range check for the members of vector or matrix $\hat{F}$), where the elements of $\hat{T}$ are all non-negative, into a term-by-term comparison of the elements of F, $-T < F < T$, where the elements of T are all non-negative, and where satisfying the test on F is sufficient to satisfy the test on $\hat{F}$. The difficulty arises from the fact that the DCT employs both positive and negative operations, which destroys the term-by-term ordering in the equation. Specifically, it cannot be said that $-\hat{T} < \hat{F} < \hat{T}$ implies that $-D^{-1}\hat{T} < F < D^{-1}\hat{T}$.

Thus, the abort involves terminating the precision of an operation when additional transform precision is projected to have an acceptable or negligible effect on the results of the subsequent processing operations, e.g., quantization or comparison. For example, the coefficients of the DCT can be scaled by an integer and approximated as sums of powers of 2. For the odd terms, one of these approximations is as follows:

$$41D = 41 \begin{bmatrix} C_1 & C_3 & C_5 & C_7 \\ C_3 & -C_7 & -C_1 & -C_5 \\ C_5 & -C_1 & C_7 & C_3 \\ C_7 & -C_5 & C_3 & -C_1 \end{bmatrix} \approx 32 \begin{bmatrix} 1 & 1 & 1 & 0 \\ 1 & 0 & -1 & -1 \\ 1 & -1 & 0 & 1 \\ 0 & -1 & 1 & -1 \end{bmatrix} +$$

$$8 \begin{bmatrix} 1 & 0 & -1 & 1 \\ 0 & -1 & -1 & 1 \\ -1 & -1 & 1 & 0 \\ 1 & 1 & 0 & -1 \end{bmatrix} + 2 \begin{bmatrix} 0 & 1 & -1 & 0 \\ 1 & 0 & 0 & 1 \\ -1 & 0 & 0 & 1 \\ 0 & 1 & 1 & 0 \end{bmatrix} + \begin{bmatrix} 0 & 0 & -1 & 0 \\ 0 & 0 & 0 & 1 \\ -1 & 0 & 0 & 0 \\ 0 & 1 & 0 & 0 \end{bmatrix}$$

which we write as (using the notation from above), $$41D \approx 2^5 {_dD_0} + 2^3 {_dD_1} + 2^1 {_dD_2} + 2^0 {_dD_3}$$

Also, as mentioned above, all of the matrices above, and their sequential sums, are invertible. Now, if $|j\hat{F}| \ll 1$, i.e., the jth element of $\hat{F}$ is very small in magnitude, then j (32 $_dD_0$ F) should be small. If it is not, then j ((8 $_dD_1$ + 2 $_dD_2$ + $_dD_3$) F) will not be able to cancel it out to make the final result small. The relative magnitudes of the results of the calculations may be checked. If one of the transform values, for one of the intermediate precisions, is small compared to the other values, or is small compared to some pre-determined threshold, then subsequent refinements for that transform value can be aborted.

Figure 4:
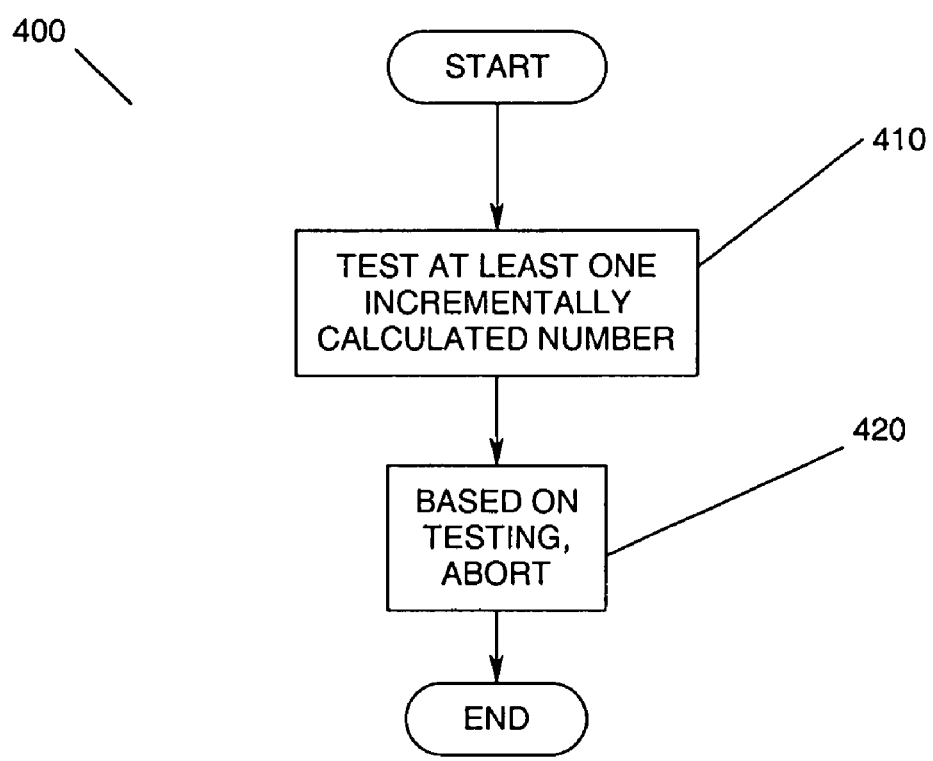
FIG. 4 illustrates a flow chart of the abort method according to the present invention that demonstrates aborting further iterations of the transform coefficient calculation process.

FIG. 4 illustrates a flow chart 400 of the abort method according to the present invention that demonstrates aborting further iterations of the transform coefficient calculation process. In FIG. 4, at least one incrementally calculated number is tested 410. If certain criteria are met, further calculations are aborted 420. The incremental calculation of a transform coefficient may be aborted when an error resulting from terminating the incremental calculation is acceptable. For example, the incremental calculation may be terminated when a determination is made that the incremental calculation will result in a number that is projected to be within a predetermined range, e.g., a transform coefficient that does satisfy a precision requirement. Alternatively, the incremental calculation of the transform coefficient may be aborted when a transform coefficient is going to be within a predetermined range of zero.

Figure 5:
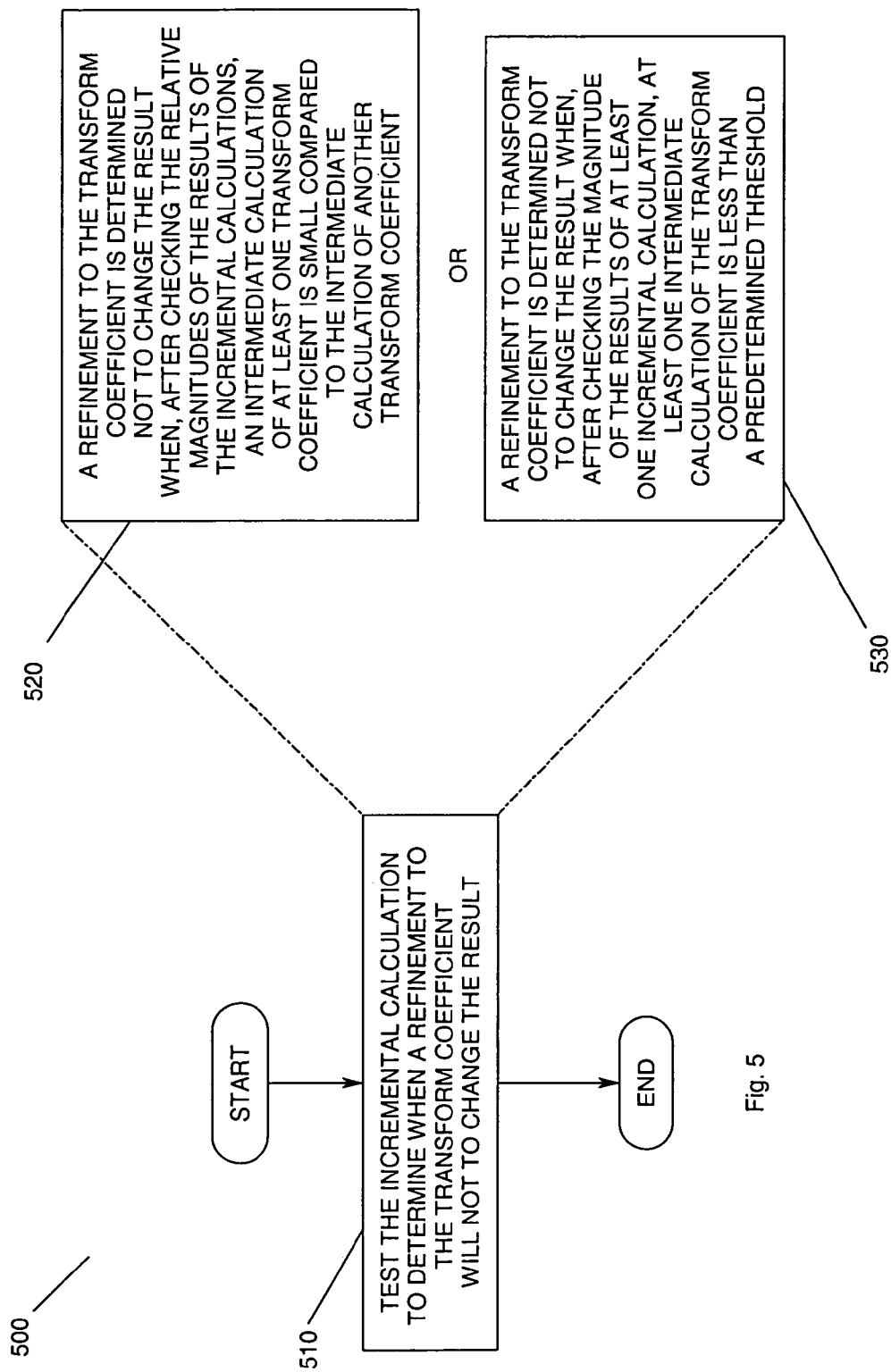
FIG. 5 is illustrates the testing of the at least one incrementally calculated number.

FIG. 5 is a flow chart 500 of the testing of the at least one incrementally calculated number. In FIG. 5, the incremental calculation is tested to determine when a refinement to the transform coefficient will not change the result 510. This testing may be carried out in at least two ways as shown in FIG. 5. A refinement to the transform coefficient may be determined not to change the result when, after checking the relative magnitudes of the results of the incremental calculations, an intermediate calculation of at least one transform coefficient is small compared to the intermediate calculation of another transform coefficient 520. Alternatively, a refinement to the transform coefficient may be determined not to change the result when, after checking the magnitude of the results of at least one incremental calculation, at least one intermediate calculation of the transform coefficient is less than a predetermined threshold 530.

Figure 6:
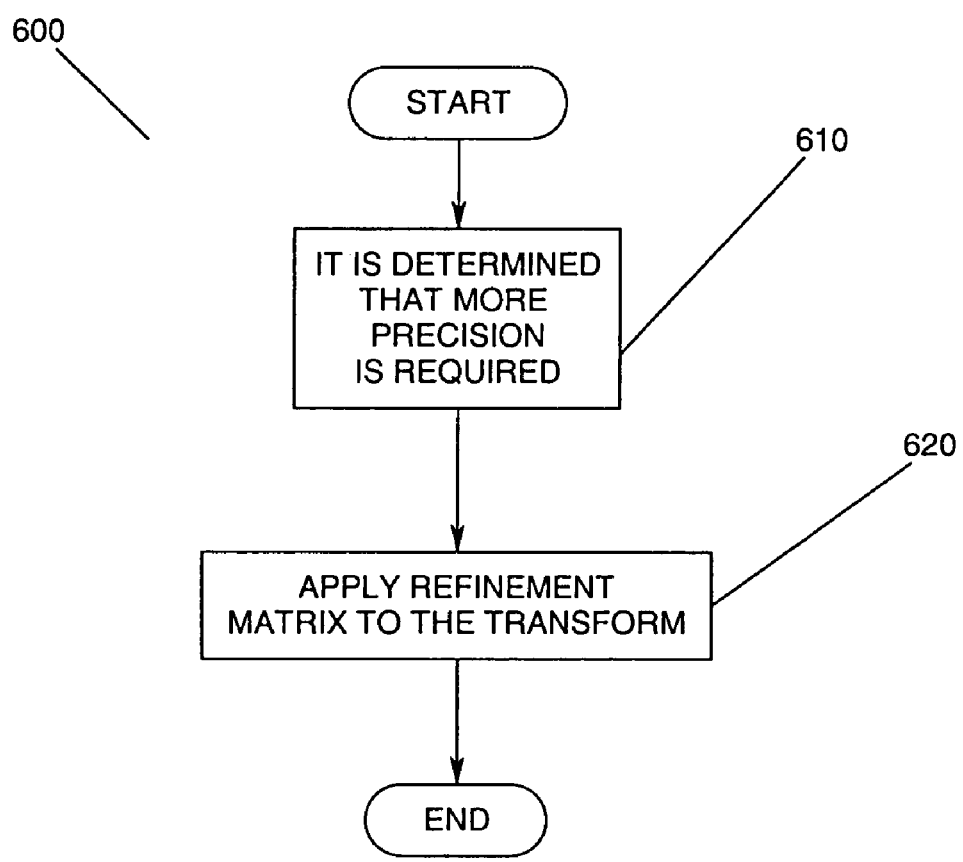
FIG. 6 is a flow chart of the refinement method according to the present invention.

FIG. 6 is a flow chart 600 of the refinement method according to the present invention. First, a determination is made whether the transform requires more precision 610. The transform is a transform matrix, wherein a refinement matrix may be used to increase precision of the incremental calculation of the transform coefficients. When more precision is required, a refinement matrix is applied to the transform 620. The refinement matrix is generated offline or at initialization and is based on approximately calculated transform constants.

Figure 7:
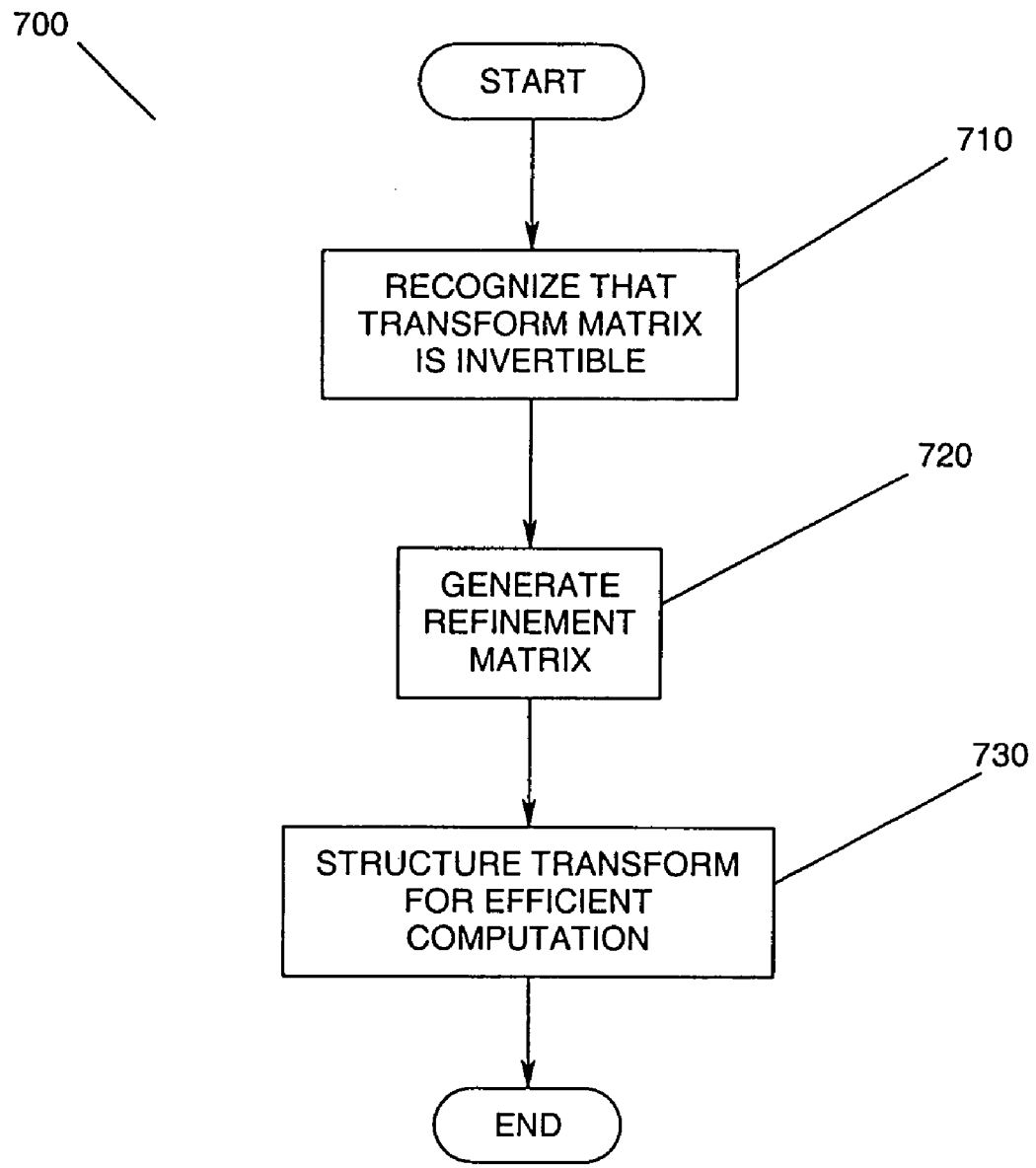
FIG. 7 illustrates a flow chart of a first method for generating a refinement matrix.

FIG. 7 illustrates a flow chart 700 of a first method for generating a refinement matrix. First, it is recognized that an approximate transform is invertible 710. The refinement matrix given by $I +_d D_{m+1} D_m^{-1}$ is generated 720. Then, the transform is structured for efficient computation 730.

Figure 8:
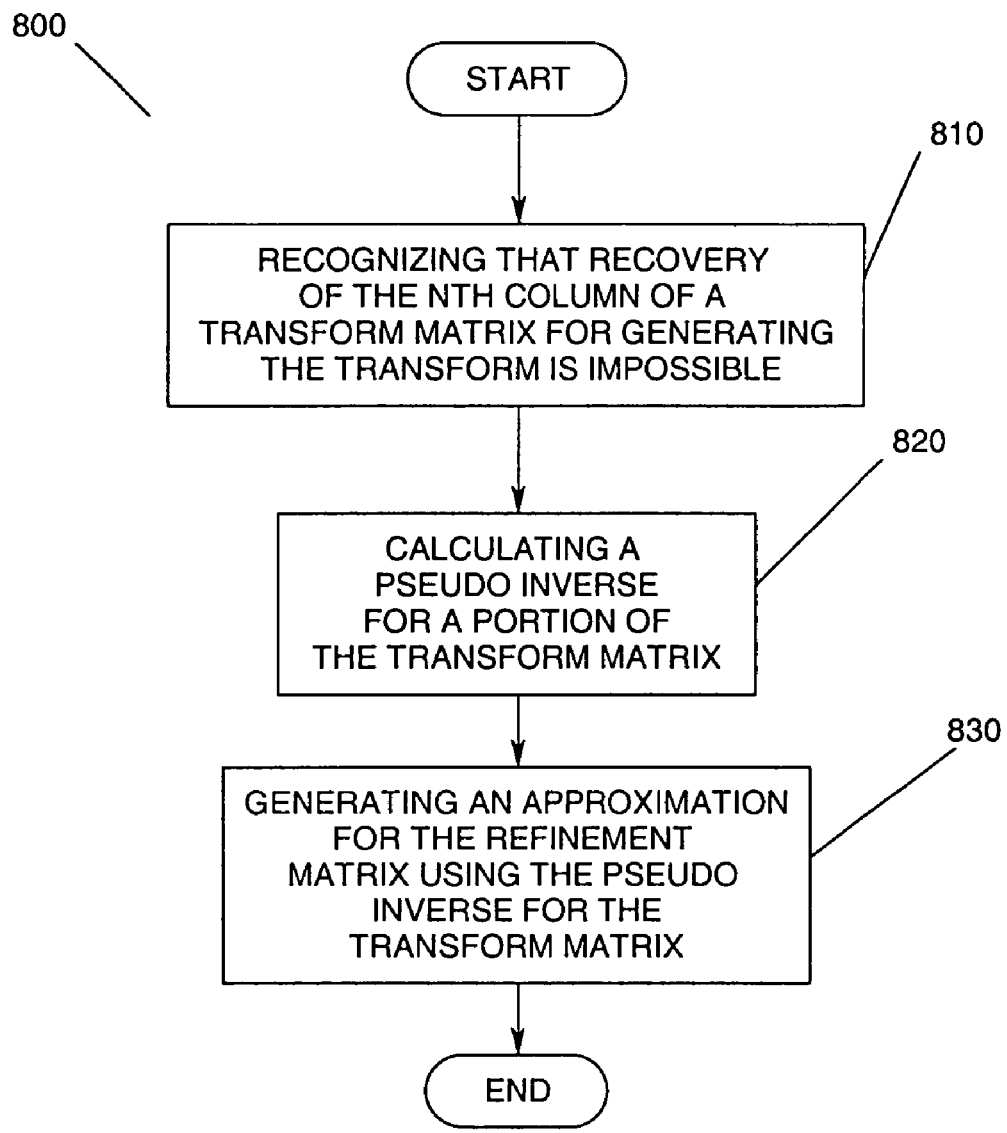
FIG. 8 is a flow chart showing a second method for generating a refinement matrix when $_dD_0$ is not invertible.

However, as described above, when $_d D_0$ is not invertible; there is no way to recover the original 8 columns of FD' from $_d D_0 FD'$. FIG. 8 is a flow chart 800 showing a second method for generating a refinement matrix when $_d D_0$ is not invertible. It is first recognized that recovery of the nth column of a transform matrix for generating the transform is impossible 810. A pseudo inverse for a portion of the transform matrix is calculated 820. Then, an approximation for the refinement matrix is generated using the pseudo inverse for the transform matrix 830. The approximation of the refinement matrix comprises $I +_d D_{1d} \tilde{D}_0$.

Figure 9:
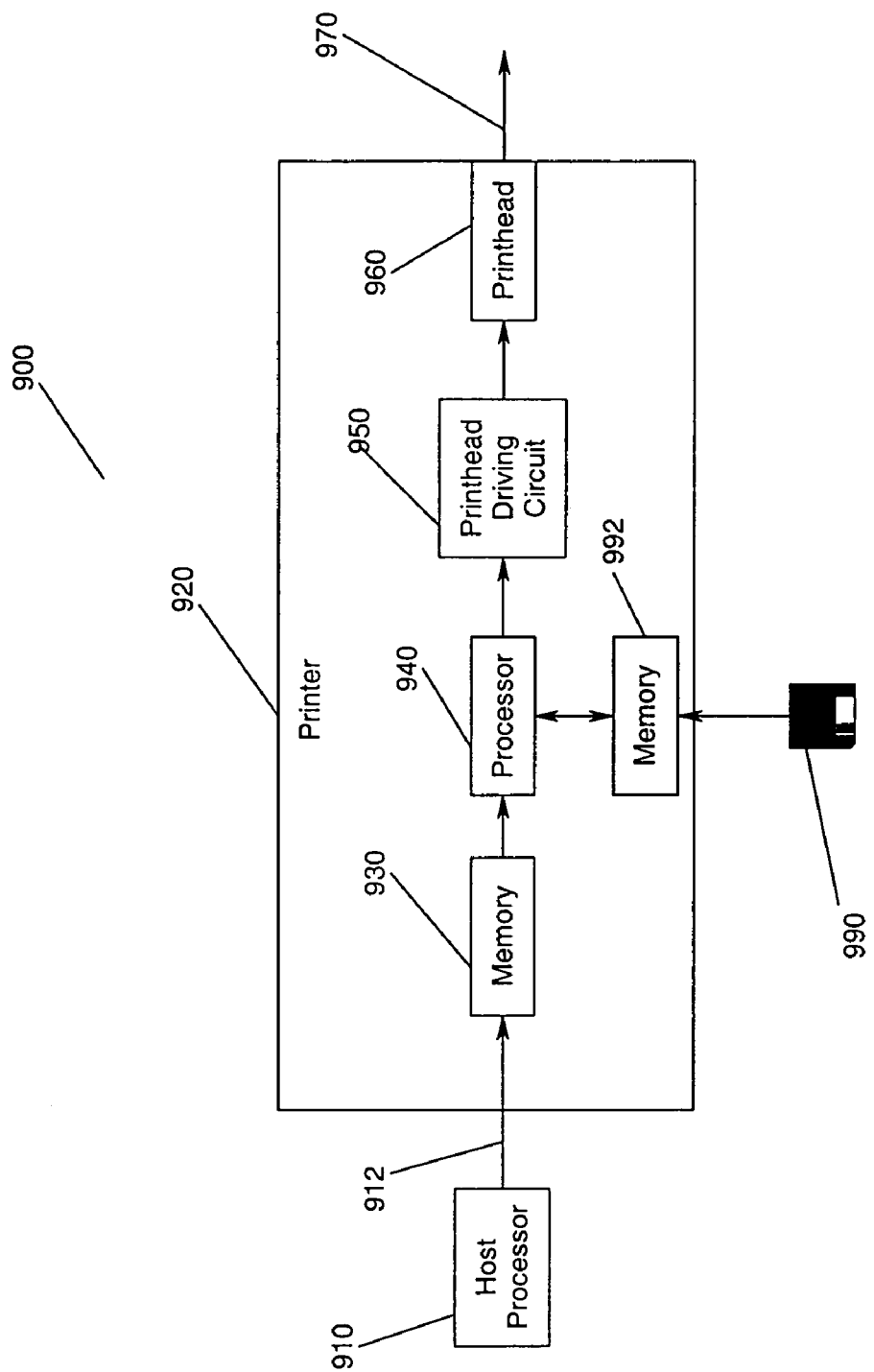
FIG. 9 illustrates a printer according to the present invention.

FIG. 9 illustrates a block diagram 900 of a printer 920 according to the present invention. In FIG. 9, the printer 920 receives image data 912 from a host processor 910. The image data 912 is provided into memory 930 where the image data may be arranged into $N_1 \times N_2$ block samples. The $N_1 \times N_2$ block samples are then processed by a processor 940, such as a raster image processor. The raster image processor 940 provides a compressed print stream representing the image data to a printhead driving circuit 950. The printhead driving circuit 950 then controls the printhead 960 to generate a printout 970 of the image data.

The process illustrated with reference to FIGS. 1–3 may be tangibly embodied in a computer-readable medium or carrier 990, e.g. one or more of the fixed and/or removable data storage devices illustrated in FIG. 9, or other data storage or data communications devices. The computer program may be loaded into the memory 992 to configure the processor 940 of FIG. 9, for execution. The computer program comprises instructions which, when read and executed by the processor 940 of FIG. 9, causes the processor 940 to perform the steps necessary to execute the steps or elements of the present invention.

Figure 10:
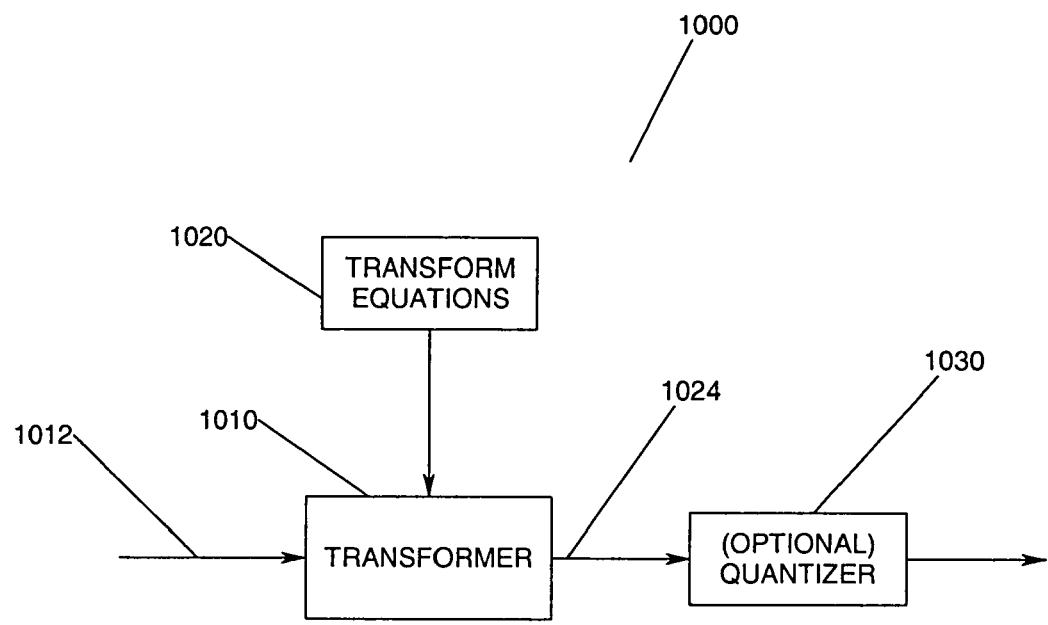
FIG. 10 illustrates a data analyzing system according to the present invention.

FIG. 10 illustrates a data analyzing system 1000 according to the present invention. In FIG. 10, a transformer 1010 receives a block of data 1012 to be analyzed. The transformer 1010 uses transform equations 1020 to generate transformed data 1024. Transform equations 1020 are split into at least one sub-transform having at least two transform constants. The at least two transform constants for each collection are scaled independently of the other collections with a scaling term to maintain a substantially uniform ratio between the at least two transform constants within the at least one collection, wherein the scaling term is chosen according to a predetermined cost function. The transformed data 1024 may then be quantized by an optional quantizer 1030.

Figure 11:
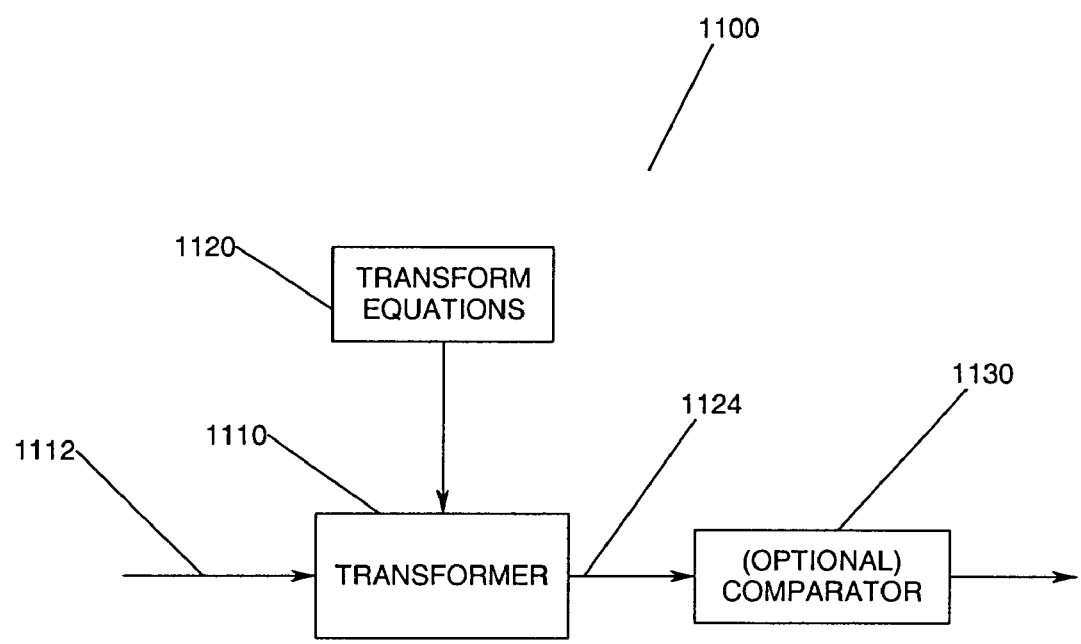
FIG. 11 illustrates another data analyzing system according to the present invention.

FIG. 11 illustrates another data analyzing system 1100 according to the present invention. In FIG. 11, a transformer 1110 receives a block of data 1112 to be analyzed. The transformer 1110 uses transform equations 1120 to generate transformed data 1124. Transform equations 1120 are split into at least one sub-transform having at least two transform constants. The at least two transform constants for each collection are scaled independently of the other collections with a scaling term to maintain a substantially uniform ratio between the at least two transform constants within the at least one collection, wherein the scaling term may be chosen according to a predetermined cost function. The transformed data 1124 may then be compared to scaled comparison values in an optional comparator 1130.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data compression system, the data compression system comprising a transformer for applying a linear analysis transform to decorrelate data into transform coefficients using transform equations, the transformer reducing errors of the transform by testing at least one number resulting from an incremental calculation of transform coefficients during a transform, determining whether to perform a corrective action based upon the testing and performing the corrective action when a corrective action is determined to be needed.

2. The data compression system of claim 1 further comprising a quantizer for quantizing the transformed data into quantized data to reduce a number of bits needed to represent the transform coefficients.

3. The data compression system of claim 1 wherein the transformer determines whether to perform a corrective action by detecting whether the incremental calculation of the transform coefficients will result in transform coefficients with unacceptable precision and performs corrective action by refining the at least one number.

4. The data compression system of claim 3 wherein the transform comprises a transform matrix and wherein the transformer refines the at least one number by applying a refinement matrix for increasing precision of the incremental calculation of the transform constants.

5. The data compression system of claim 4 wherein the refinement matrix comprises $I+_d D_{m+1} D_m^{-1}$.

6. The data compression system of claim 4 wherein the refinement matrix is based on approximately calculated transform constants.

7. The data compression system of claim 6 wherein the refinement matrix is generated offline or at initialization.

8. The data compression system of claim 5 wherein the refinement matrix is generated by recognizing that an approximate transform is invertible, generating the refinement matrix given by $I+_d D_{m+1} D_m^{-1}$, and structuring the transform for efficient computation.

9. The data compression system of claim 5 wherein the refinement matrix is generated by recognizing that recovery of the nth column of a transform matrix for generating the transform is impossible, calculating a pseudo inverse for a portion of the transform matrix and generating an approximation for the refinement matrix using the pseudo inverse for the transform matrix.

10. The data compression system of claim 9 wherein the approximation of the refinement matrix comprises $I+_d D_{1d} D_0$.

11. The data compression system of claim 1 wherein the transformer determines whether to perform a corrective action by determining whether an error resulting from terminating the incremental calculation is acceptable and performs corrective action by aborting the incremental calculation of a transform coefficient.

12. The data compression system of claim 11 wherein the transformer terminates the incremental calculation when a determination is made that the incremental calculation will result in a number that is projected to be within a predetermined range.

13. The data compression system of claim 12 wherein the number that is projected to be within a predetermined range comprises a transform coefficient that does satisfy a precision requirement.

14. The data compression system of claim 12 wherein the transformer terminates the incremental calculation when a refinement to the transform coefficient is determined not to change the result.

15. The data compression system of claim 14 wherein the transformer determines that a refinement to the transform coefficient will not change the result when, after checking the relative magnitudes of the results of the incremental calculations, an intermediate calculation of at least one transform coefficient is small compared to the intermediate calculation of another transform coefficient.

16. The data compression system of claim 14 wherein the transformer determines that a refinement to the transform coefficient will not change the result when, after checking the magnitude of the results of at least one incremental calculation, at least one intermediate calculation of the transform coefficient is less than a predetermined threshold.

17. The data compression system of claim 1 wherein the transformer determines that a corrective action is to be determined by determining that a transform coefficient is going to be within a predetermined range of zero and performs corrective action by aborting the incremental calculation of the transform coefficient.

* * * * *